Patented Jan. 9, 1940

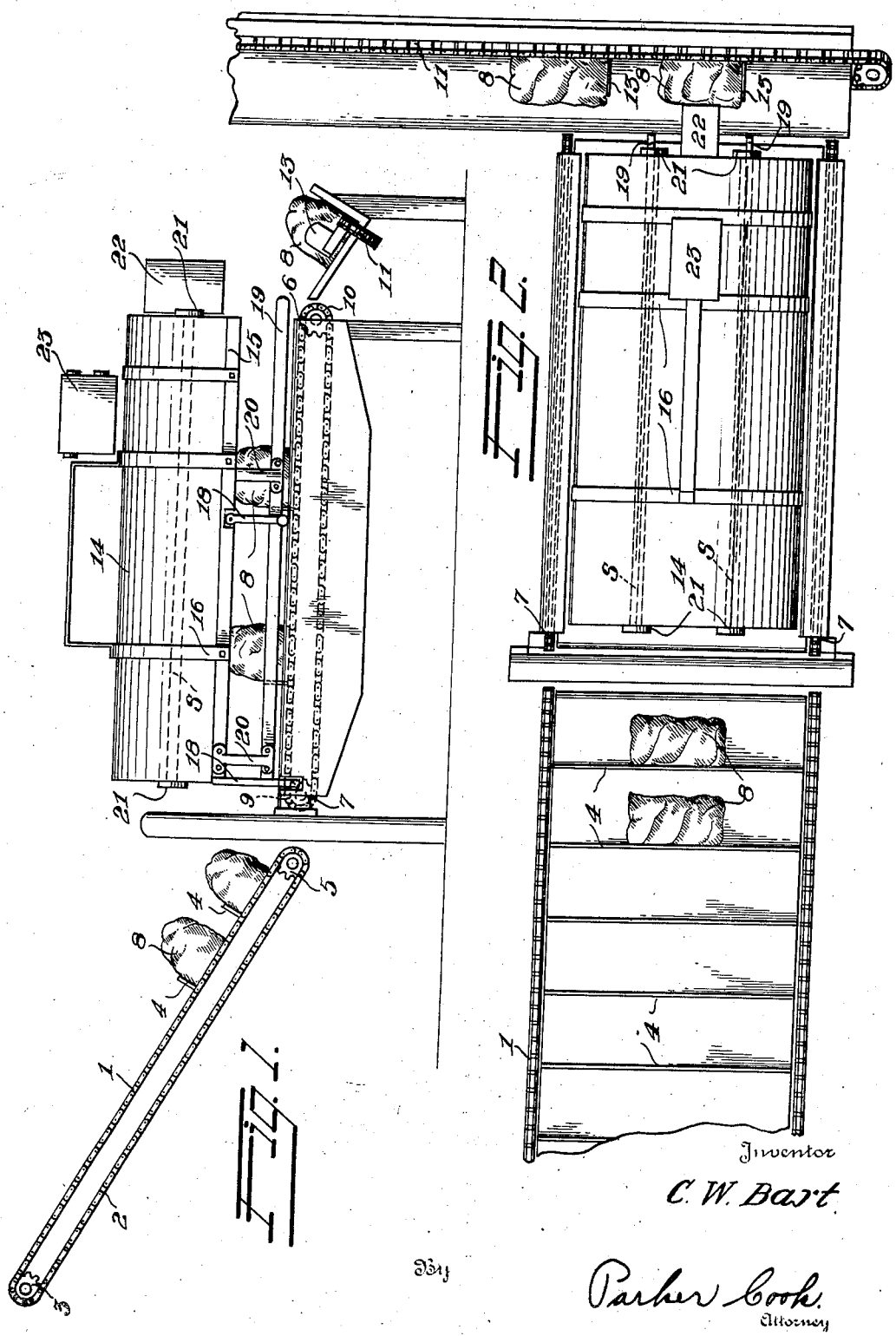

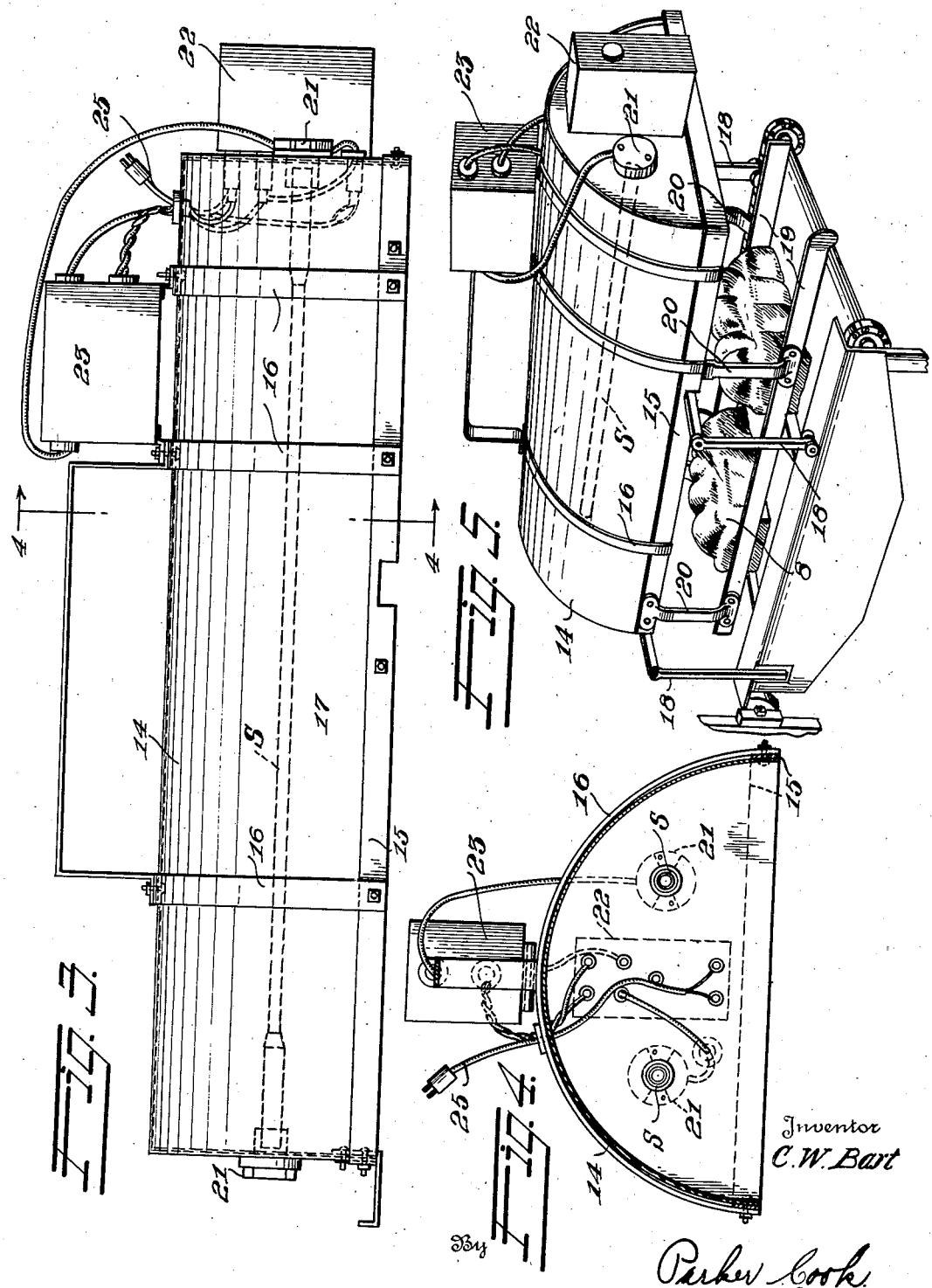

2,186,401

UNITED STATES PATENT OFFICE 2,186,401

APPARATUS FOR DESTROYING MOLD SPORES

Charles W. Bart, Savannah, Ga.

Application February 18, 1938, Serial No. 191,309

1 Claim. (Cl. 250—52)

My invention relates to new and useful improvements in a machine for killing mold spores and expediting the wrapping of freshly baked bread.

As is well known to those skilled in the art of bread baking, there is a relatively heavy loss to the baker, due to the fact that within the hour or two hours that the bread is allowed to cool before wrapping, bacteria, that is, mold spores, form on the bread, which quickly multiply after the bread is wrapped, so that the bread is likely to be delivered to the customer in a moldy condition.

To overcome this formation of the mold spores, different methods and apparatus have been tried, such as spraying the bread with hydrogen peroxide or subjecting the bread to ozone or to certain light rays with different filters, but as far as I am aware, none of these methods has proved practical.

Lately, however, there has been devised a lamp, which is highly efficient in killing different forms of bacteria, and the present invention has to do with the adaptation of these lamps, together with certain mechanisms, so that the freshly baked bread, that is, after being allowed to cool, may be placed on a conveyor, which conveyor leads to a mold spore killing station. Then, immediately after the bread leaves the killing station, it passes directly to the conveyor of the bread-wrapping machine, thus overcoming any further possibility of mold spores forming on the bread.

An object of the invention, therefore, is the provision of a conveyor which extends to a mold spore killing station, which station is provided with an endless conveyor and certain guides and lamps, which are properly shielded from view as their rays are detrimental to the eyes of a beholder. Directly at the end of the mold spore killing station, there is the conveyor for the wrapping machine, so that the loaves pass in a steady stream from the conveyor to the station, under the lamps and directly to the conveyor of the bread-wrapping machine.

Still another object of the invention is to provide a table or station intermediate a conveyor from the cooling room directly to the mold spore killing station, so that the mold spores may be destroyed on the bread and immediately after the bread is subjected to these bacteria killing rays, it will pass to the bread-wrapping machine, thus assuring a loaf free of mold spores.

Still another object of the invention is to provide a conveyor leading to the mold spore killing station, together with a conveyor at the mold spore killing station and a bread-wrapping conveyor, all of which conveyors will be synchronized so that the bread will pass in a steady stream through the station into the bread-wrapping machine.

With these and other objects in view, my invention consists in certain new and novel arrangements and combination of parts, as will be hereinafter more fully explained and pointed out in the claim.

Referring now to the drawings:

Fig. 1 is a diagrammatic view showing the feeding conveyor to the mold spore killing station;

Fig. 2 is a top plan view of the same;

Fig. 3 is a side elevation of the upper part of the mold spore killing station, showing the hood and the lamp running from end to end of the hood;

Fig. 4 is a sectional view taken on the line A—A of Fig. 3; and

Fig. 5 is a perspective of the mold spore killing station showing two loaves of bread being properly guided beneath the lamps just prior to passing to the bread-wrapping machine.

At the outset, it is to be noted that no claim is made to the lamp per se. Rather, the invention relates to the adaptation and arrangement of these lamps together with the remainder of the killing station and the arrangement of the conveyors, so that no appreciable time is lost from the baking of the bread and its cooling to the wrapping of the bread, and, at the same time, the killing of all mold spores is assured, there being no likelihood of any further mold spores forming on the bread between the time it is subjected to the lamp and the time the wrapper is placed over the loaf.

It is also to be noted that the drawings are of a schematic nature, as any means for synchronizing the various conveyors may be used, and, although a preferable form of mold spore killing station is illustrated, this also may be modified without departing from the spirit and scope of the invention.

Referring now more particularly to the several views, in Fig. 1 there is shown an endless conveyor 1, which may be made up of desirable links 2, which conveyor passes over a suitably mounted sprocket 3, which will be adjacent the delivery door of the cooling room (not shown). Several partitions 4 are also shown for properly spacing the bread, and it is understood that these partitions will extend throughout the length of the conveyor.

The lower end of the conveyor passes over the sprocket 5, while suitable means will, of course, be used to operate this endless conveyor.

Situated adjacent the lower end of the endless conveyor 1 is the mold spore killing table 6, which is likewise provided with an endless conveyor 7, so that the bread loaves 8 will pass from the conveyor 1 directly onto the endless conveyor 7 of the station 6. This endless conveyor also passes over the sprockets 9 and 10, while its rate of travel is synchronized with the rate of travel of the conveyor 1, so that the loaves may pass in an unbroken stream from the conveyor 1 to the conveyor 7 and from the table 6 to the endless conveyor 11 of the bread-wrapping machine.

The endless conveyor 11 of the bread-wrapping machine is also shown diagrammatically, and it will be noted that it travels at right angles to the conveyor 7. It is, of course, adjacent the delivery end of the table, so that the loaves 8 in dropping from the conveyor 7 will drop onto the conveyor 11 and each loaf will be engaged by a finger plate 13 to properly space the loaves and run them to the wrapping machine (not shown).

It will be understood that the feeding conveyor 1 and the bread-wrapping conveyor 11 may be arranged in any manner, so that the rate of speed of the several conveyors may be synchronized and the loaves will properly pass onto and off the table in an unbroken stream.

Referring now more particularly to Figs. 3, 4, and 5, there is shown the upper part of the spore killing station, there being mounted directly above the conveyor 7 the metal shield or hood 14, which may consist of the angle framework 15, the carline 16, and the sheet metal covering 17. Suitable legs or stanchions 18 support the hood to the table at a desired height, so that the loaves 8 may pass directly under the hood and under the two lamps S.

In order that all of the loaves of bread may be similarly subjected to the sterilization rays of the lamp, about to be mentioned, I provide the guide, consisting of the two longitudinally extending side pieces 19, which are supported from the framework 15 of the hood by the arms 20. The space between these two longitudinal side frames is such that the bread will properly pass along these side pieces at right angles to the longitudinal dimension of the table.

In the several figures, there may be seen the lamps S, which are mounted in suitable sockets 21 at the opposite ends of the hood 14. It is necessary to provide a relay 22 and a transformer 23 and the inlet or lead-in may be seen as represented at 25.

As heretofore mentioned, these lamps per se do not form a part of the present invention and are described in detail in a pamphlet published March 27, 1937, Westinghouse Lamp Division, Bulletin TD-62.

Briefly, the lamp is a tubular gaseous lamp utilizing two cold electrodes sealed in a long, slender, glass envelope. Radiations from the lamps are produced in the mercury spectrum with the greatest portion of the radiant energy in the region of 2537 Angstroms. The light from these lamps contains ultra-violet rays and they are designed for certain specific uses where the extermination of bacteria is desired.

The lamps must be operated only under conditions which provide adequate protection for the eyes and which minimize as much as is practically possible the direct exposure of the skin. They are very effective in killing bacteria, and, with the adaptation shown in the drawings and above-described, I have successfully treated thousands of loaves of bread in this manner without any mold appearing on the bread thus wrapped.

The operation of the device is exceedingly simple. After the table station 16 is properly interposed between the feeding conveyor 1 and the bread-wrapping conveyor 11 and the means arranged for synchronizing the drives of the several conveyors, the current will be switched onto the lamps and the loaves successfully exposed to the action of the rays to thus kill all the bacteria on the loaves, after which the loaves will drop to the wrapping conveyor to be wrapped and ready for the market.

From the foregoing, it will be seen that I have provided an effective and efficient means for killing the mold spores on the bread as the bread travels from the cooling room to the bread-wrapping machine. The bread, of course, is first allowed to cool and then it is passed to the feeding conveyor at room temperature, but any bacteria or mold spores that have formed on the bread during this period will be killed, and inasmuch as the bread is wrapped immediately, there is very little likelihood of any other bacteria forming on the bread, so that the customer will receive the loaf in a fresh condition and free from mold.

It will be understood that the design of the table might be changed and the arrangement of the conveyors changed without departing from the spirit and scope of the invention, provided the loaves are subjected to the rays of the lamp for a proper period of time directly on leaving the cooling room and then fed directly to the wrapping machine.

Having thus described my invention, what I claim as new and desire to secure by Letters Patent is:

A portable mold spore killing station for treating freshly baked loaves of bread, said station adapted to be interposed intermediate a cooling room and a bread-wrapping machine, said killing station consisting of a table, an endless conveyor extending throughout the length of the table for receiving the bread to be treated, guide arms extending substantially the length of the table and spaced thereabove for positioning the bread as it travels the length of the table, means on the conveyor for spacing the loaves of bread from each other, a metal hood carrying said guide arms secured to the table and extending over the conveyor, the length of the hood being coextensive with the length of the table, the side edges of the hood being spaced slightly above the top of the table, ultra-violet ray lamps mounted in said hood and also coextensive with the length of the hood and the table, the associated parts of the lamps also secured to said hood to make up a complete portable unit, whereby the loaves of bread will be subjected to the ultra-violet rays during their entire trip beneath the hood and the length of the table, and the loaves subjected to the ultra-violet rays on all sides except their bottoms.

CHARLES W. BART.